May 7, 1968 M. C. CECKA 3,381,820
SCREENING FRAMES AND SCREEN-TENSIONING MEANS THEREFOR
Filed March 7, 1966 4 Sheets-Sheet 1
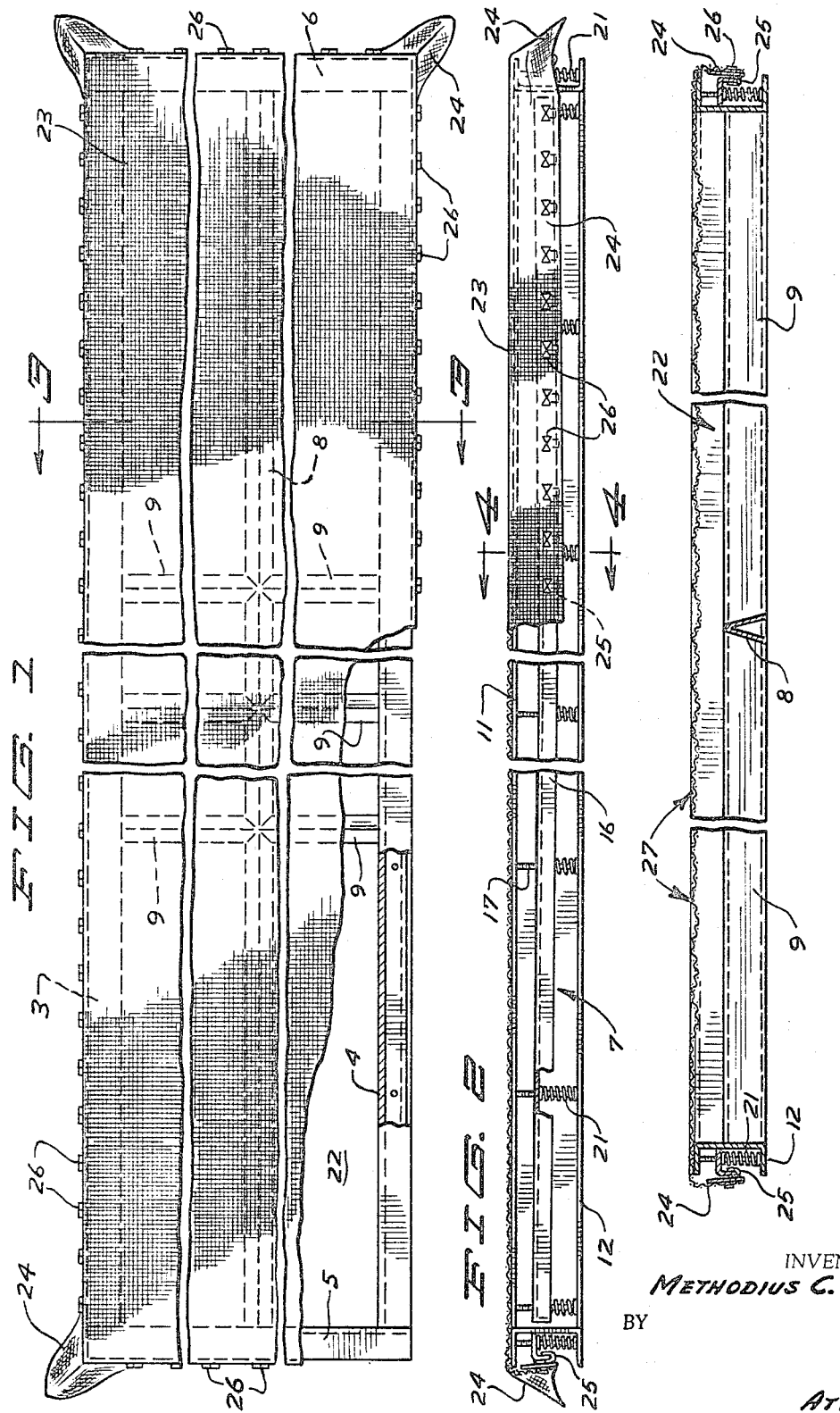
INVENTOR.
METHODIUS C. CECKA
BY
ATTORNEYS May 7, 1968   M. C. CECKA   3,381,820
SCREENING FRAMES AND SCREEN-TENSIONING MEANS THEREFOR
Filed March 7, 1966   4 Sheets-Sheet 2
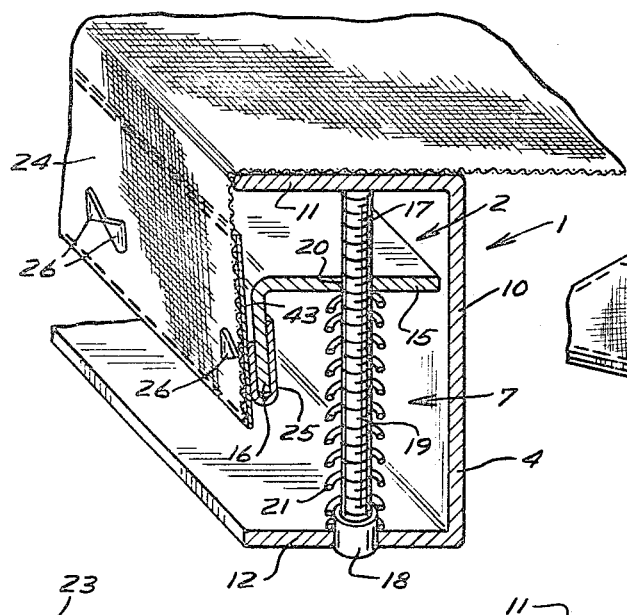
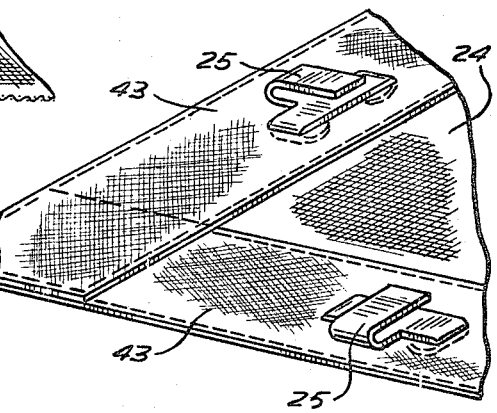
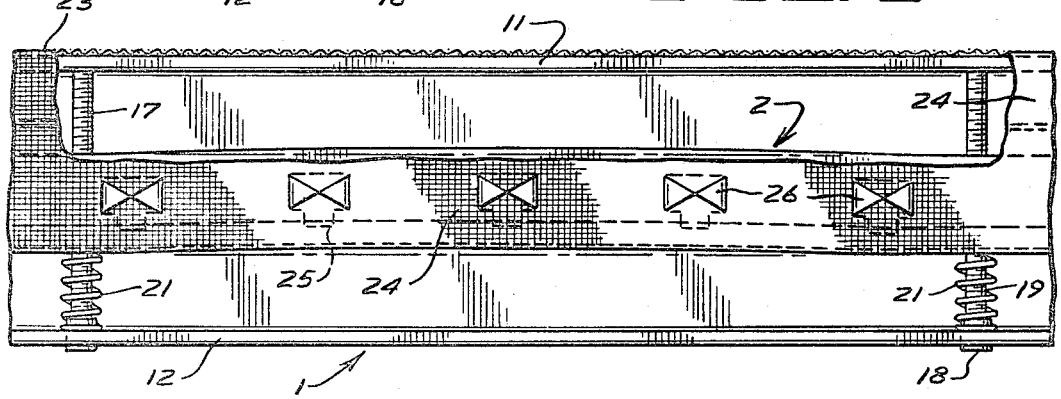
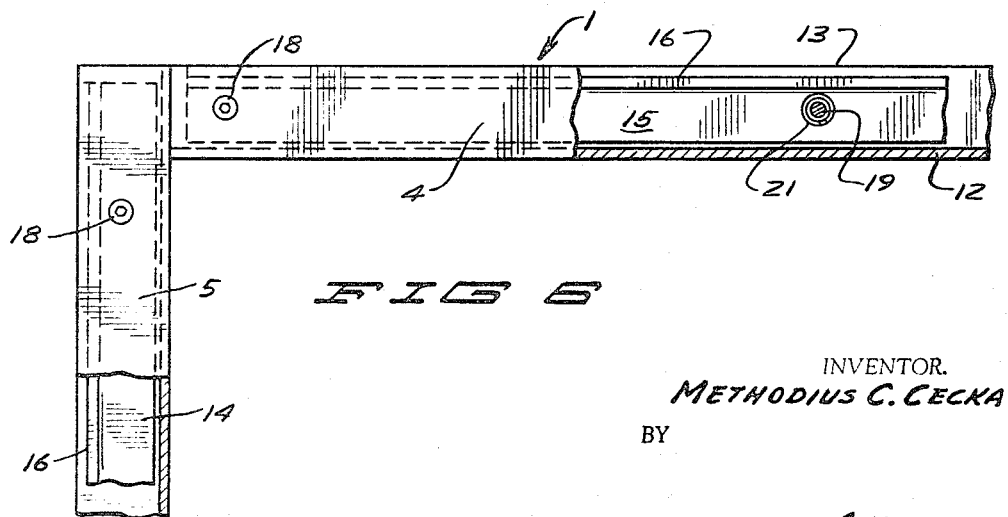
INVENTOR.
METHODIUS C. CECKA
BY
ATTORNEYS

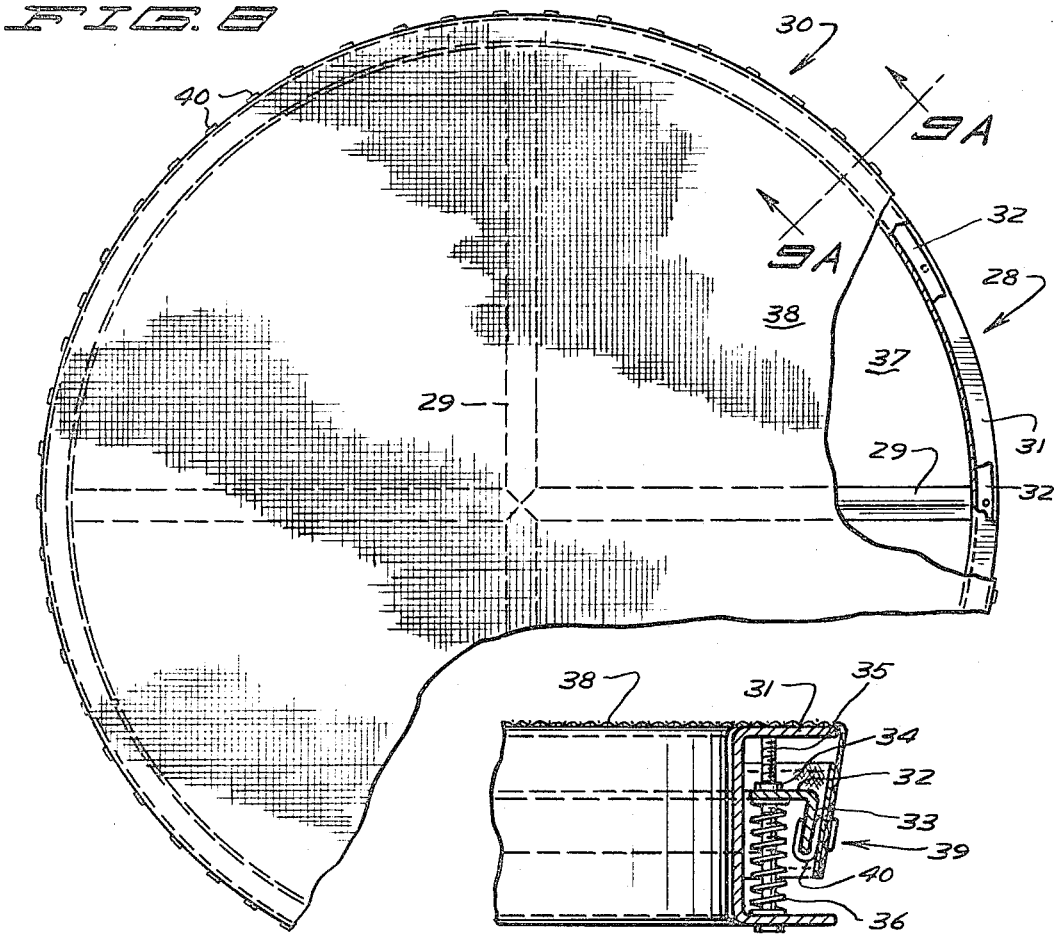
FIG. 8
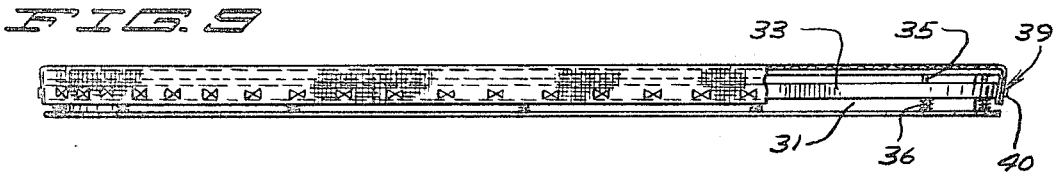
FIG. 9A
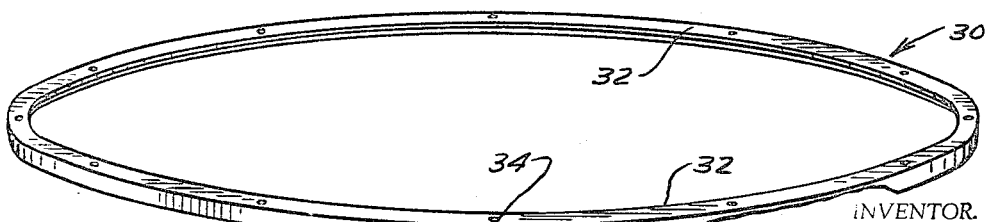
FIG. 9
FIG. 10
INVENTOR.
METHODIUS C. CECKA
BY
ATTORNEYS May 7, 1968 M. C. CECKA 3,381,820
SCREENING FRAMES AND SCREEN-TENSIONING MEANS THEREFOR
Filed March 7, 1966 4 Sheets-Sheet 4
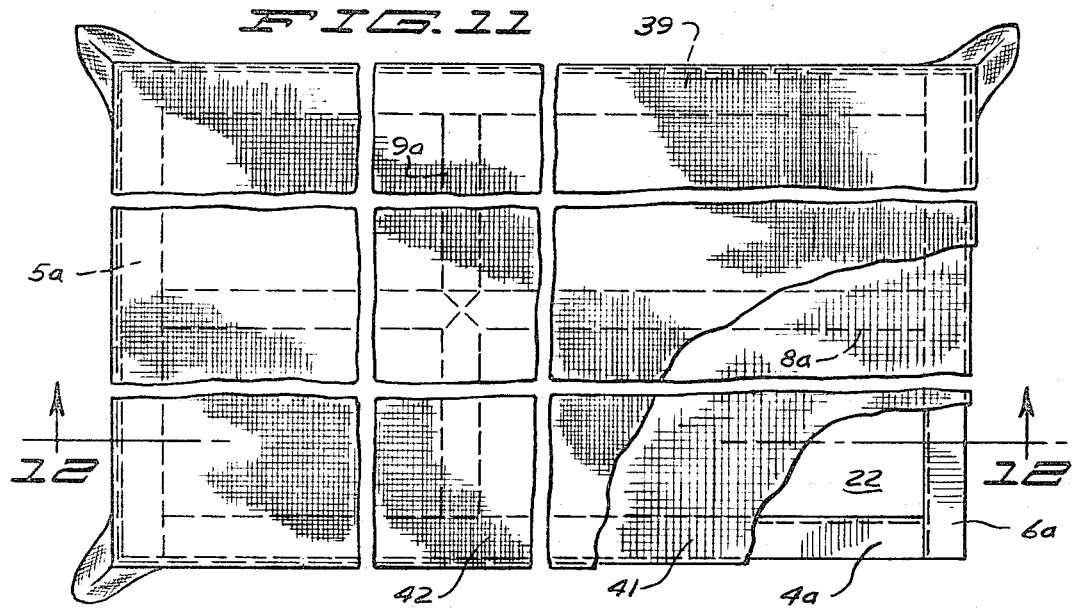
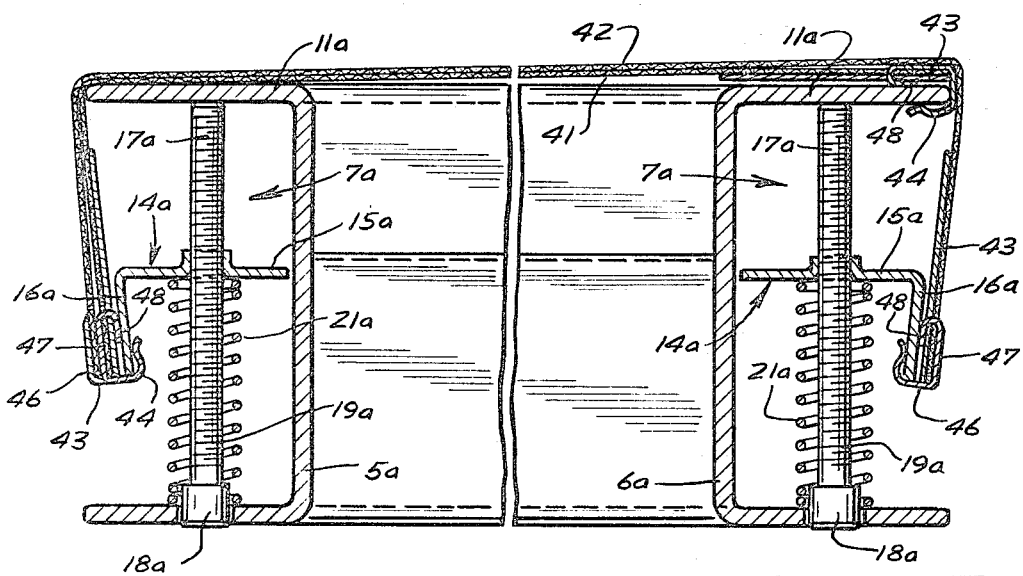
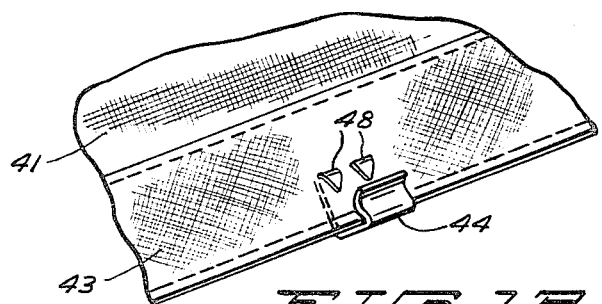
INVENTOR.
METHODIUS C. CECKA
BY
ATTORNEYS

United States Patent Office 3,381,820
Patented May 7, 1968

3,381,820
SCREENING FRAMES AND SCREEN-TENSIONING MEANS THEREFOR
Methodius C. Cecka, Minneapolis, Minn., assignor to Screen-Tec, Inc., Minneapolis, Minn., a corporation of Minnesota
Filed Mar. 7, 1966, Ser. No. 532,211
8 Claims. (Cl. 209—403)

ABSTRACT OF THE DISCLOSURE

A frame for removably receiving a flexible, resilient perforate screen to be maintained under a substantially uniform tension on a planar surface defined by the frame. The frame including a rigid frame defining at least one substantially planar surface for supporting a flexible screen is provided with movable, resilient, adjustable tensioning devices along at least two adjacent marginal extremities. The tension devices are provided with adjusting means which will not distort the frame and are further adapted to removably connect to spaced apart peripheral marginal areas of a flexible resilient screen and to be adjustable relative to the frame to uniformly secure and thereby tension the screen on the frame by the use of spaced apart means for imparting movement of the adjusting means relative to a planar portion of the frame, such movement being provided in a manner which will not tend to distort the planar surface defined by the frame.

---

This invention relates generally to improvements in screen structures, and more particularly to a screen mounting frame and means for applying controlled tension to a flexible screen element or the like on the mounting frame.

In the mounting of screen elements on supporting frames for various uses, such as sifting, straining or filtering of finely divided material, or for use as a screen printing media, it is highly important that the screen element be uniformly taut over its entire operating area, so that all portions of said entire operating area are equally effective in their operation. Hence, an important object of this invention is the provision of a rigid frame defining a central opening, a screen overlying said opening, and novel means for applying controlled and uniform tension to all portions of the screen overlying said frame opening.

Another object of this invention is the provision of mounting frame means and a screen as set forth, having means whereby the tension on the screen may be quickly and easily varied at different marginal edge portions of the screen.

Another object of this invention is the provision of mounting frame means and a screen as set forth, and means for mounting the screen on the frame means whereby the screen may be quickly and easily removed from the frame means for inspection, cleaning or the like, and as quickly and easily remounted and placed under desired uniform tension without injury to the fabric of the screen.

Still another object of this invention is the provision of mounting means for a screen as set forth, by means of which the screen may be easily and accurately adjustably moved relative to the frame, for purposes of alignment, registration and the like.

Still another object of this invention is the provision of screen-tensioning means operatively to apply desired tension to the screen with a minimum of distortion of the frame means on which the screen is mounted.

Yet another object of this invention is the provision of screen-tensioning means which can be used to impart uniform controlled tension to flat screens of various shapes and sizes.

Another object of this invention is the provision of a screen, mounting frame means, and adjustable tensioning means which are light in weight, relatively simple and inexpensive to produce, which are highly efficient in operation, and which are rugged in construction and durable in use.

To the above ends, I provide frame means comprising a relatively rigid peripheral primary frame and a relatively resilient secondary frame, the primary frame defining an opening and having opposed frame portions and adapted to support a screen adjacent the marginal edge of the screen. At least some of the primary frame portions are cross-sectionally angularly shaped to define a generally laterally outwardly opening recess extending therealong, the secondary frame being longitudinally disposed in the recess. I further provide a screen having a marginal edge portion overlying the primary frame and having a plurality of spaced hook elements for removably securing the screen to the frame means, and means for moving the resilient secondary frame relative to the primary frame in a direction axially of the opening defined by the primary frame to apply tension to the screen and draw all portions thereof overlying said opening taut, with a minimum of distortion to the primary frame.

The above, and still further highly important objects and advantages of this invention will become apparent from the following detailed specification, appended claims and attached drawings.

Referring to the drawings, which illustrate the invention, and in which like reference characters indicate like parts throughout the several views:

FIG. 1 is a view in top plan of a screen produced in accordance with this invention, some parts being broken away and some parts being shown in section;

FIG. 2 is a view in side elevation of the screen of FIG. 1, some parts being broken away and some parts being shown in section;

FIG. 3 is a transverse section taken substantially on the line 3—3 of FIG. 1, some parts being broken away;

FIG. 4 is an enlarged fragmentary section in perspective, taken substantially on the line 4—4 of FIG. 2;

FIG. 5 is an enlarged fragmentary view corresponding to a portion of FIG. 2, some parts being broken away and some parts being shown in section;

FIG. 6 is a fragmentary view in bottom plan of a portion of the frame means of this invention, some parts being broken away and some parts being shown in section;

FIG. 7 is an enlarged fragmentary view in perspective of a portion of the screen element of FIGS. 1–5;

FIG. 8 is a view in top plan of a modified form of the invention, some parts being broken away and some parts being shown in section;

FIG. 9 is a view in side elevation of the modification of FIG. 8, some parts being broken away and some parts being shown in section;

FIG. 9A is an enlarged sectional view of the right end of FIG. 9;

FIG. 10 is a view in perspective of a secondary frame illustrated in FIGS. 8 and 9;

FIG. 11 is a view corresponding to FIG. 1 but showing another modified arrangement;

FIG. 12 is a fragmentary view in section, taken substantially on line 12—12 of FIG. 11; and FIG. 13 is a fragmentary view in perspective of one of the screens of FIGS. 11 and 12.

In the embodiment of the invention illustrated in FIGS. 1–7, frame means is shown as comprising a generally rectangular primary frame 1 and a secondary frame 2, the primary frame 1 comprising a pair of laterally spaced parallel frame members 3 and 4 joined at their ends by cross-frame members 5 and 6. The frame members 3–6 are preferably metallic and generally U-shape in cross-section, whereby to define a peripheral outwardly opening recess or channel 7. The primary frame 1 further includes a longitudinal brace member 8 welded or otherwise rigidly secured at its opposite ends to the cross-frame members 5 and 6, and cross braces 9 welded at their inner ends to the longitudinal brace member 8 and at their outer ends to adjacent ones of the longitudinal frame members 3 and 4.

With reference particularly to FIG. 4, it will be seen that each of the frame members 3–6 of the primary frame 1 comprises a generally vertically disposed wall 10 and generally horizontally disposed upper and lower walls 11 and 12 respectively, these walls defining the channels or recesses 7. The secondary frame 2 comprises a pair of longitudinal frame sections 13 and a pair of cross-frame sections 14, the longitudinal frame sections 13 being disposed one each in the recess or channel 7 of a different one of the frame members 3 and 4, and the cross-frame sections 14 being disposed one each in the channel or recess 7 of the cross-frame members 5 and 6, the frame sections 13 and 14 extending longitudinally of their respective recesses or channels 7. With further reference to FIG. 4, it will be seen that the primary frame 1 is made from metal of substantially greater thickness than that of the secondary frame 2, whereby the primary frame 1 is relatively rigid, the secondary frame sections 13 and 14 being relatively resilient, for a purpose which will hereinafter become apparent. Each of the secondary sections 13 and 14 is cross-sectionally L-shaped, comprising a generally horizontally disposed wall or flange 15 and an outer generally vertically disposed depending flange or wall 16. Each secondary frame section 13 and 14 is mounted for generally vertical movements in its respective channel or recess 7 by a plurality of vertically disposed adjustment screws 17 disposed in longitudinally spaced relationship in each of the channels 7 and having enlarged heads 18 journaled in the bottom walls 12 of their respective primary frame members, and threaded shanks 19 that are screw threaded in threaded openings 20 in the horizontal walls or flanges 15 of their respective secondary frame sections 13 and 14. The upper ends of the adjustment screws 17 abut the under surfaces of their respective upper walls 11 of the primary frame members, and are urged into abutting relationship with their respective upper walls 11 by coil compression springs 21 each encompassing a different one of the adjustment screws 17 and interposed between the lower primary frame wall 12 and the horizontally disposed wall or flange 15 of the overlying secondary frame section. With reference to FIG. 6, it will be seen that the heads 18 of the screws 17 are provided with suitable recesses for reception of adjustment tools, such as screwdrivers, wrenches or the like, not shown.

The several frame members 3–6 of the primary frame 1 cooperate to define a central opening 22 that is traversed by the several braces 8 and 9, the axis of the opening 22 being parallel to the several adjustment screws 17. A perforate screen 23, preferably made from woven fabric, such as cloth or metal, is adapted to overlie the primary frame 1 and the central opening 22. The screen 23 is normally flat, and corresponds in outline to the outline of the primary frame 1 but of greater length and width than the primary frame 1. The screen 23 is provided with a reinforced marginal edge portion 24 that is provided with a plurality of longitudinally spaced inwardly opening hook elements 25 that are secured to the marginal edge 24 by locking tabs or the like 26. As shown, the hook elements 25 have hooking engagement with the vertical wall or flange 16 of their adjacent secondary frame sections 13 and 14.

When all of the hook elements 25 are hooked over their adjacent depending flanges 16, the screen 23 is placed under the desired tension by manipulating the several adjustment screws 17. It will be noted that, when the screws 17 are rotated in a direction to tighten the screen, the marginal edge 24 and those portions of the screen adjacent the marginal edge are pulled downwardly or in a direction axially of the central opening 22, the downwardly pull or stress of the fabric being offset by the upward push of the adjustment screws 17 against the top wall 11 of each primary frame member. Thus, the tensioning stresses are concentrated in a restricted area of each top wall 11 between the adjustment screws 17 and the laterally outer edges of the top walls 11, resulting in minimal twist or distortion of the primary frame members. By proper manipulation of the adjustment screws 17, uniform tension may be applied over the entire area of the screen overlying the central opening 22 and in directions longitudinally and transversely of the primary frame 1 as well as diagonally thereof. In view of the fact that the frame is more rigid at the corners than at points intermediate the corners, the adjustment screws 17 adjacent the corners of the frame 1 are tightened less than those at the intermediate portions of the several primary frame members to obtain uniform tension in the screen 23. The resilience of the secondary frame sections 13 and 14 permits the same to be slightly downwardly bowed, as shown in FIG. 2, whereby controlled uniform tension is achieved. Further, the spacing between adjacent adjustment screws 17 in each frame member 3–6 and secondary frame sections 13 and 14 permits upward deflection of the secondary frame members 13 and 14 between adjacent ones of the adjustment screws 17, should the screen 23 be subjected to excess tension due to overtightening of the adjustment screws 17, or to expansion of the primary frame 1 when subjected to heat under given working conditions. This upward deflection of the secondary frame sections is shown by full lines in FIG. 5, the normal straight condition of the secondary frame section being shown by broken lines in FIG. 5. This deflection of the secondary frame sections is highly effective in preventing rupture of the screen 23 when in an over-stressed condition.

Under some operating conditions, when the screen 23 is used as a sifting screen, and caused to be vibrated or oscillated to perform a sifting or separating function, it is sometimes desirable to cause the material flowing over the screen to travel at different speeds over some areas of the screen than over others, or to cause some areas of the screen to have greater or less rebounding characteristics than other thereof. This is easily achieved by manipulation of given ones of the adjustment screws 17 to lessen the tension of given areas of the screen. In fact, the screen 23 may be tensioned to be taut and smooth at some areas thereof, whereas in others the same may be caused to have a fairly slack and wavy appearance, such as indicated at 27 in FIG. 3. Shifting of the screen 23 laterally or longitudinally of the primary frame 1 is easily effected by loosening the adjustment screws 17 at given portions of the primary frame 1 and tightening of the screws 17 at opposite side portions of the frame 1. Thus, in screen printing, the screen may be easily adjusted for proper registry of the printing area thereof with the area to be printed on a workpiece.

As shown in FIGS. 8, 9 and 10, the apparatus of this invention lends itself to shapes other than rectangular, a circular primary frame being indicated by the reference numeral 28, the same being cross-sectionally channel-shaped in the manner of the primary frame members 3–6 and being reinforced by radial brace members 29, whereby to provide a rigid primary frame structure. A relatively resilient secondary frame 30 of circular form, is disposed within the annular recess or channel 31 defined by the rigid primary frame 28, and comprises a generally horizontal annular wall 32 and a depending generally cylindrical flange 33, the annular wall 32 having a plurality of circumferentially spaced screw-threaded openings 34 for reception of adjustment screws 35 similar to the adjustment screws 17, and provided with coil compression springs 36 similar to the springs 21. The primary frame 28 defines a circular opening 37, the adjustment screws 35 extending in directions parallel to the axis of the opening 37.

A screen 38 overlies the central opening 37 and the top portion of the primary frame 28, and is circular in outline, having a reinforced circular marginal edge 39 that is provided with a plurality of circumferentially spaced inwardly opening hook elements 40 that operatively engage the lower edge of the depending flange 33 of the secondary frame 30. Controlled uniform tension is applied to the screen 38 by manipulation of the adjustment screws 35 in the same manner as described above in connection with the structure of FIGS. 1–7.

In the modified arrangement illustrated in FIGS. 11–13, the primary frame, secondary frame and adjustment means for the secondary frame are identical to those of FIGS. 1–6, and the various parts thereof are identified by the same reference characters with the suffix, $a$, added. In the arrangement illustrated in FIGS. 11–12, a pair of superposed lower and upper screens 41 and 42 respectively are used, the screen 41 having a reinforced marginal edge 43 to which is anchored a plurality of longitudinally spaced inwardly opening hook elements 44, the screen 42 having a reinforced marginal edge 45 having anchored thereto a plurality of longitudinally spaced inwardly opening hook elements 46. The hook elements 44 and 46 are substantially identical and have back or shank portions 47 that are disposed against the outer surface of their respective marginal screen portions 43 and 45, and anchoring tabs 48 which project laterally inwardly through their respective marginal screen edges 43 and 45 and are downturned against the inner surfaces thereof.

In the arrangement illustrated in FIGS. 11 and 12, the hook elements 44 of two adjacent side edges of the screen 41 are operatively hooked to the outer edge portions of the top wall 11a of one of the end frame members 5a or 6a and an adjacent one of the side frame members 3a or 4a. The hook elements 44 at the opposite side edges of the screen 41 are hooked over the lower edges of the depending flanges 16a of the secondary frame members in the channels 7a of the opposite primary frame members. With this arrangement, it will be seen that two adjacent side edges of the screen 41 are anchored to relatively stationary frame members, while the opposite adjacent sides are anchored to adjustable secondary frame members. These adjustable secondary frame members are then adjusted by manipulation of their respective adjustment screws 17a to apply the desired tension to the screen 41 over the central opening 22a defined by the primary frame 1a. The screen 42 is then placed in overlying relationship to the screen 41, and the hook elements 46 thereof hooked over the lower edges of the depending flanges 16a of all of the secondary frame sections 13a and 14a. The secondary frame sections 13a and 14a underlying those primary frame upper walls 11a to which the hook elements 44 of the screen 41 are applied, are adjusted to properly tension the screen 42 over the underlying screen 41.

I have found that, with the arrangement illustrated in FIGS. 11–13 and above described, controlled tension can be applied to the screen 41 and 42 uniformly over the entire operative surfaces thereof. In this arrangement, the screens 41 and 42 cannot be adjusted or shifted with respect to the primary frame 1a. However, where superposed screens are employed, shifting or adjustments of the screens laterally of the primary frame is seldom, if ever, necessary. It will be appreciated that the screen 38 in the embodiment illustrated in FIGS. 8–10 can be shifted or adjusted laterally or radially of the primary frame 28 by loosening of some of the adjustment screws 35 and tightening of diametrically opposite adjustment screws 35.

With an understanding of the above described preferred embodiment of my invention modifications (not shown) of the means for attaching the screen elements to the adjustable tensioning elements will occur to those skilled in the art to which my invention is related. For example, the edges of the screen element may be provided with a plurality of openings in the form of grommets, securely fastened in place, and the outwardly facing portion of the movable tensioning element may be provided with a corresponding, complementary disposed plurality of studs, pins or hooks formed integrally of the tensioning element, for engaging and holding the grommets in the screen element. These and other modifications capable of providing a connection between the edge of the screen element and the tensioning element to provide for a rapid and easy assembly and disassembly are believed to lie within the scope of my invention.

In all of the forms of the invention illustrated and described, the screens may be quickly and easily removed by merely loosening their respective adjustment screws and unhooking the screens from their respective frame means, for cleaning or replacement. Replacement of the screens on their respective frame means may be as easily and quickly accomplished, as above described.

This invention has been thoroughly tested and found to be completely satisfactory for the accomplishment of the objectives set forth; and while I have shown and described a preferred form and two modified arrangements of screen frames and screen tensioning means therefore, it will be understood that the same is capable of further modification without departure from the spirit and scope of the invention, as defined in the claims.

1. A device of the class described comprising:
(a) frame means including a relatively rigid primary frame and a relatively resilient secondary frame, said primary frame having opposed frame portions and defining a central opening;
(b) at least one of said opposed frame portions being cross-sectionally angularly shaped to define a generally laterally outwardly opening recess extending therealong;
(c) said resilient secondary frame being disposed within said recess and extending therealong;
(d) a flexible resilient perforate screen adapted to overlie said central opening and each of said frame portions;
(e) a plurality of spaced apart hook means secured to one of said screen and frame means and adapted to operativey engage the other of said screen and said frame means at said opposed frame portions;
(f) a plurality of spaced apart means mounting said resilient frame generally within said recess and for imparting movement to said secondary frame in a direction axially of said central opening whereby to apply variable controlled tension along the marginal edge of said screen to draw same uniformly taut over said opening and said primary frame with a minimium of distortion to said primary frame.

2. The apparatus of claim 1 in which the hook means are disposed on the screen.

3. A device of the class described comprising:
(a) a rigid primary frame having opposed frame portions and defining a central opening;
(b) said frame portions being cross-sectionally generally U-shaped to define a laterally outwardly opening recess extending therealong;
(c) resilient secondary frame means receivable generally within the recess of each of said frame portions and extending therealong;
(d) a flexible resilient perforate screen adapted to overlie said central opening and said frame portions;
(e) a plurality of spaced apart hook means secured to one of said screen and secondary frame means and adapted to operatively engage the other of said screen and secondary frame means at said opposed portions of the primary frame;
(f) a plurality of means mounting said secondary frame means within said recess and for imparting movement to said secondary frame means in a direction axially of said central opening whereby to position said screen with respect to said opening and apply variable controlled tensioning to the marginal edge of said screen to draw same uniformly taut over said opening and said primary frame.

4. The structure of claim 3 in which said screen comprises a pair of superposed screen elements each having independent hook means comprising a plurality of spaced hook elements secured to the marginal edge of their respective screen elements, a plurality of said hook elements along a marginal edge portion of one of said screen elements operatively engaging one portion of said primary frame, the hook elements at the opposite marginal edge portion of said one of the screen elements operatively engaging an adjacent portion of said secondary frame means, a plurality of said hook elements of the other of said screen elements operatively engaging said frame means at a portion opposite said one portion thereof, the hook elements at the opposite marginal edge portion of said other of said screen elements operatively engaging said secondary frame adjacent said one primary frame.

5. The structure of claim 3 in which said primary frame includes upper and lower generally parallel flange elements and a connecting wall portion and in which said secondary frame means is cross-sectionally angular and includes a generally horizontal leg and a generally vertical leg depending from the outermost edge of said generally horizontal leg, said generally vertical leg having a lower edge, said hook means being carried by the marginal edge of said screen for hooking engagement with said lower edge of the vertical leg.

6. The structure of claim 5 in which the included angle defined by said horizontal leg and said vertical leg is an acute angle.

7. The structure of claim 5 in which the lower of said flange elements defines a plurality of apertures at spaced points longitudinally thereof, and in which the means mounting said secondary frame means comprises:

(a) a plurality of screw elements one each receivable through one of said apertures, said screw elements having shank portions and head portions at one end of said shank portions;

(b) said shank portions projecting through and having threaded engagement with said horizontal leg of said secondary frame, the other ends of said shank portions engaging said upper flange element, said head portions being journaled one each in a cooperating one of said apertures whereby said screen may be positioned relative to said opening and controlled tensions applied thereto along the marginal edge thereof at an angle substantially 90° to the plane of said upper flange responsive to rotation of selected ones of said screw elements in one direction; and (c) yielding means biasing said screw elements toward engagement of said other ends thereof with said upper flange intermediate the outer edge thereof and said connecting wall and urging said secondary frame toward said upper flange whereby said means securing the marginal edge of said screen to said secondary frame may be disengaged responsive to rotation of said screw elements in the other direction.

8. The structure of claim 5 in which the hook means for securing said screen along its marginal edge to said lower edge of said secondary frame means comprises a plurality of cooperating pairs of opposed hook elements, the hook elements of each pair thereof being secured to opposite marginal edge portions of said screen.

References Cited

UNITED STATES PATENTS

| | | | |
|---|---|---|---|
| 309,498 | 12/1884 | Smith | 209—403 |
| 323,143 | 7/1885 | Heine | 209—403 |
| 1,582,390 | 4/1926 | Evans | 101—415.1 |
| 1,906,336 | 5/1933 | Reynolds | 209—403 |
| 1,997,740 | 4/1935 | Nickerson | 209—403 |
| 2,015,087 | 9/1935 | Rafton | 209—403 |
| 2,218,451 | 10/1940 | Heyne | 101—415.1 |
| 2,651,419 | 9/1953 | Overstrom et al. | 209—403 X |
| 2,668,498 | 2/1964 | Boyajean | 101—415.1 |
| 2,894,455 | 7/1959 | Lambert | 101—415.1 |
| 2,985,303 | 5/1961 | Wright | 209—403 X |
| 3,070,230 | 12/1962 | Peterson | 209—403 X |
| 3,126,332 | 3/1964 | Salete | 209—408 |
| 3,193,098 | 7/1965 | Bingham | 209—403 |

HARRY B. THORNTON, *Primary Examiner.*

TIM R. MILES, *Examiner.*